Figure 1:
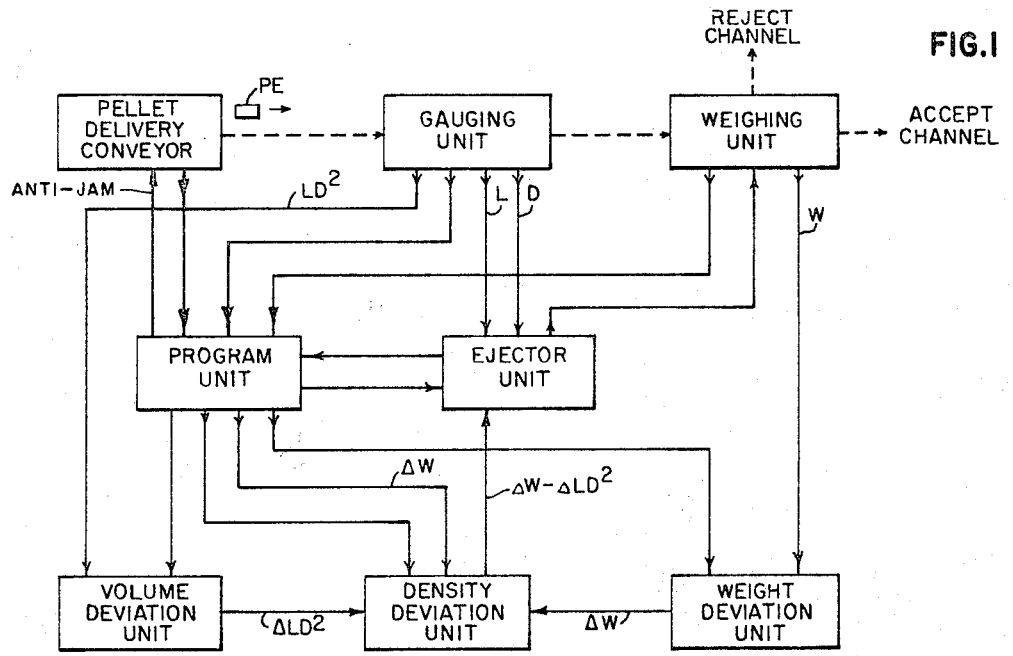

Sept. 13, 1966 W. JONES 3,272,332
CLASSIFICATION METHOD AND APPARATUS
Original Filed March 14, 1961 2 Sheets-Sheet 1

United States Patent Office

3,272,332
Patented Sept. 13, 1966

3,272,332
CLASSIFICATION METHOD AND APPARATUS
Wallace Jones, Saltsburg, Pa., assignor to Nuclear Materials and Equipment Corporation, Apollo, Pa., a corporation of Pennsylvania
Original application Mar. 14, 1961, Ser. No. 108,220, now Patent No. 3,221,152, dated Nov. 30, 1965. Divided and this application Dec. 2, 1964, Ser. No. 423,883
3 Claims. (Cl. 209—75)

This application is a division of Patent 3,221,152, granted November 30, 1965, to Wallace Jones and assigned to Nuclear Materials and Equipment Corporation.

This invention relates to the classification art and has particular relationship to the classification of objects in accordance with their respective densities. In its specific aspects this invention concerns itself with the detection of small deviations in density of objects from a standard or norm and classification of these objects in accordance with such selection and it is an object of this invention to effect such detection and classification with high precision.

Nuclear reactors include fuel assemblies the basic fuel element of which is a pellet of a fissionable material. It is essential that the density of these elements be maintained within tight tolerances to avoid over or under concentration of neutronic reaction, and it is a specific object of this invention to provide a method and apparatus for classifying such elements so as to select for neutronic use only those elements having densities within such tight tolerances.

The novel method and apparatus for precise classification of objects according to this invention has as its basis determination of the deviation of the density from volume and weight measurements. In accordance with this invention this determination is made in an unusual manner by a computation from the measured dimension deviations and measured weight deviation of each object and the invention includes within its scope the method of making the computation, and classification apparatus. The length and diameter of each object is gauged and the product of the gauged length and square of the gauged diameter is compared with the product of length and squared diameter for a standard to determine the percent deviation of the volume. The present deviation of the weight of each pellet from the weight of the standard is also determined. The percent deviation of density is determined by taking the difference between the percent deviation of volume and the percent deviation of weight.

That this difference yields the correct result is shown in the above-identified parent application.

The pellets to which this invention is particularly applicable are small circular cylinders. In this case the determinative dimensions are the length and the diameter of each pellet.

In accordance with the specific aspects of this invention the length and diameter of each pellet are gauged by caliper-like elements connected to set the cores respectively of associated linear variable differential transformers (herein called LVDT's). The output of the length LVDT is compared with the output of another LVDT and the difference balanced to zero by a servo motor operating on the core of the latter. This motor sets the length L on a suitable impedance, specifically a potentiometer. Similarly the output of the diameter LVDT is compared to the output of a fourth LVDT and balanced by another motor. The latter motor sets the diameter, D, on the diameter potentiometer and also sets potentiometers which measure respectively the LD and $LD^2$.

The analogue of $LD^2$ is compared to potential on a potentiometer which is set for the product of the length by the square of the diameter for a standard pellet; this measures the percent deviation of volume.

The weight is measured by a scale on which the movement of the weighing arm is measured by a fifth LVDT and is balanced out to give percent deviation of weight. The difference between the weight and volume deviation is then taken.

One of the important features of this invention is the use of the servo controlled potentiometers. These potentiometers over their whole range cover a small percentage of variation of the length and diameter respectively; 5% is typical. These potentiometers thus are set to accurate analogues of the actual length or diameter. Typically the length potentiometer at one extreme measures 110% of the standard length and at the other 90% of the standard. An error of 2.5% of the range on either side of the setting of the potentiometer would be an error of only .25% in the length measurement.

In accordance with a further specific aspect of this invention provisions are made to reject pellets the dimensional parameters of which fall outside of the set limits of contact making meters; these limits must not exceed the limits (for example 110%–90%) of the computer potentiometers. Memory switch means is provided which is actuable for any parameter which falls outside of the range limits of the corresponding meter. Responsive to the actuation of this switch means, pellets having one or more parameters falling outside of these limits are rejected. In the practice of this invention it is essential that the set range limits of the contact making meters be consistent with industrial demands. The limits for length and diameter should be set so that the pellets falling outside of the limits are undesirable for reactor use solely because they fall outside of one or the other limits (have too great or too small a diameter or length) regardless of whether or not the density of such pellets may fall within the standards demanded. To achieve this purpose the limits are usually different for different parameters. The volume, weight and density limits are correspondingly set.

Figure 2A:
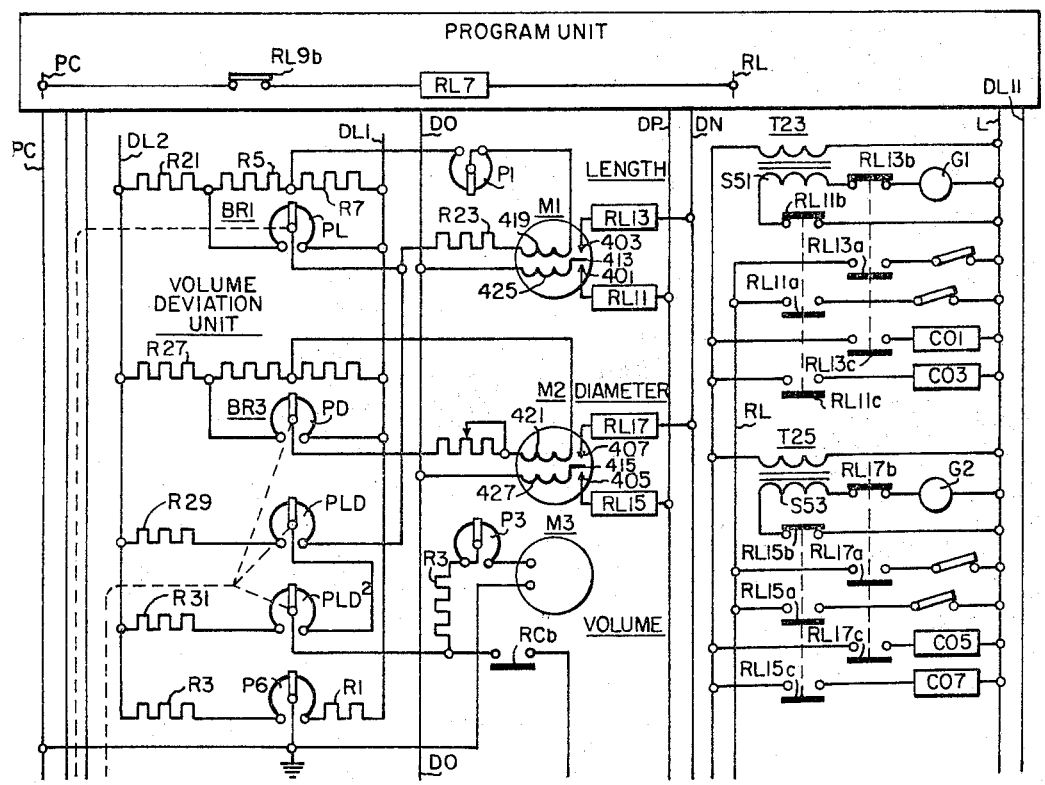
Figure 2B:
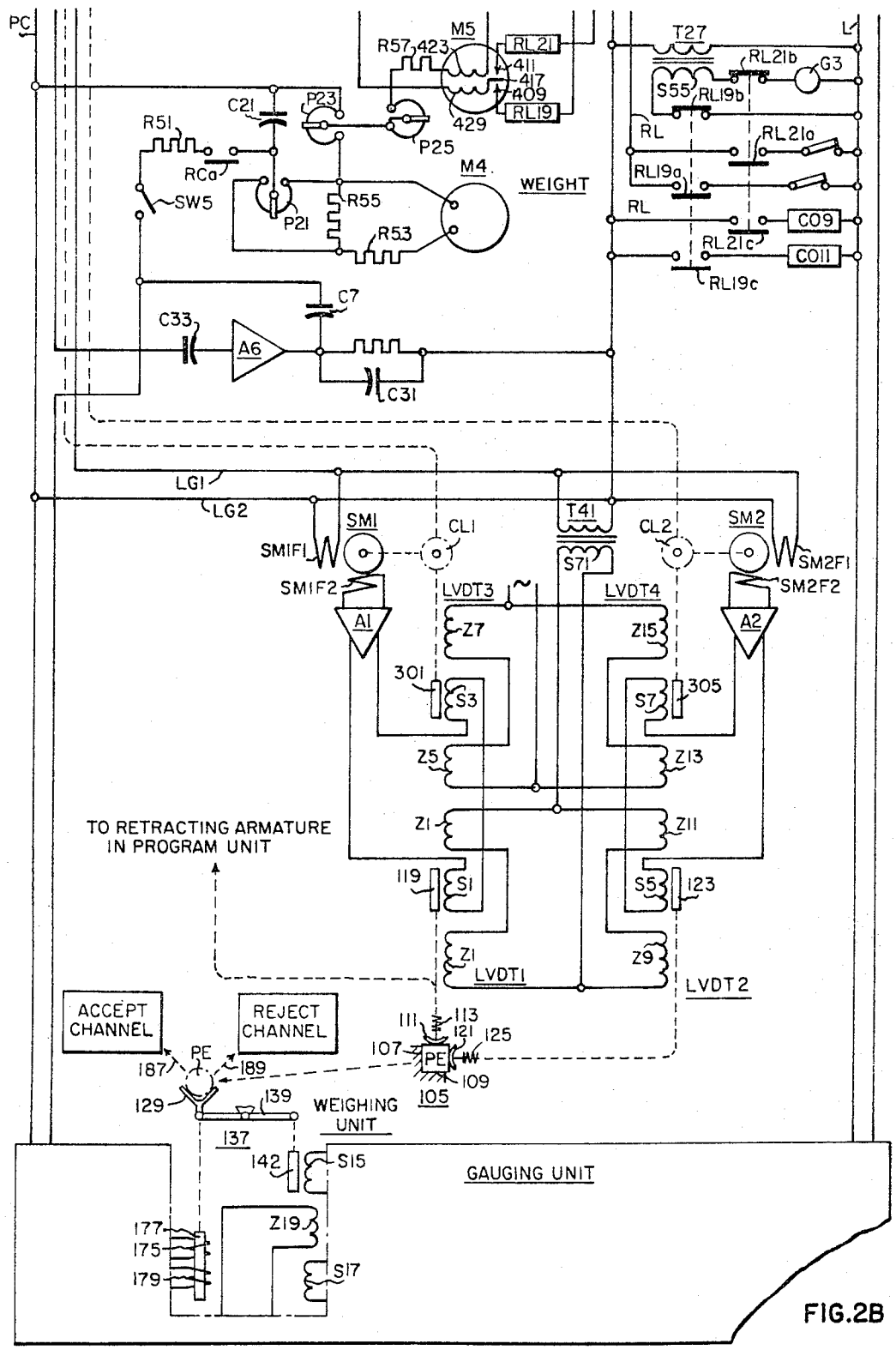

In a typical situation in apparatus which was constructed and found to operate satisfactorily and in which the density of the pellets were maintained to plus or minus 2½% and the weight to plus or minus 10% the corresponding computer potentiometer had a range over the following limits:

Diameter of pellet—plus or minus 2½% of standard
Length of pellet—plus or minus 10% of standard
Volume of pellet—plus or minus 25% of standard The invention in detail, both as to its organization and as to its method of operation, together with the objects and advantages thereof, will be understood from the following description of specific embodiments of this invention taken in connection with the accompanying drawings, in which:

FIGURE 1 is a block diagram showing the principal components of apparatus according to this invention and with which this invention is practiced and their mechanical and electrical relationship; and FIGS. 2A and 2B together constitute a schematic showing in detail of the parts of FIG. 1 with which this invention is practiced.

In the parent Patent 3,221,152 this invention is illustrated as applied to the processing of generally cylindrical fuel pellets for nuclear reactors. FIG. 1 shows the components of the apparatus according to this invention as blocks. The broken line arrows between the blocks present the mechanical movement of the pellets; the full-line arrows the flow of electrical information.

The pellets PE are delivered by a Pellet Delivery Conveyor to the Gauging Unit where the diameter, D, and the length, L, are measured and $LD^2$ is computed. From the Gauging Unit the pellets are delivered to a Weighing Unit where each pellet is weighed. From the Weighing Unit each pellet is transferred either to an Accept channel or to a Reject channel depending on the operation of the Ejector Unit.

The Ejector Unit operates on each pellet PE after the weighing operation and its operation depends on the electrical information which it receives. The Gauging Unit sets the Ejector Unit to reject, through information channels L or D if L or D respectively exceed preset limits. In addition the Gauging Unit sends the product $LD^2$ for each pellet to the Volume Deviation Unit where the product is compared with the similar product for a standard. The volume deviation $\Delta LD^2$ thus derived is transmitted to the Density Deviation Unit.

The operation in the Weighing Unit leads to the transfer of weight information for each pellet to the Weight Deviation Unit which transfers the weight deviation $\Delta W$ to the Density Deviation Unit. The latter calculates the density deviation, $\Delta W - \Delta LD^2$, and transfers information to the Ejector Unit if the density deviation exceeds preset limits.

If the Ejector Unit receives no information of exceeded limits for length, diameter or density deviations it ejects the pellet into the Accept Channel; if the Ejector Unit receives information that L, D or $\Delta W - \Delta LD^2$ exceed preset limits it ejects the pellet into the Reject Channel. The sequencing of the mechanisms which move the pellets PE through the Gauging Unit and Weighing Unit and which operate the Ejector Unit at the proper time is controlled by the Program Unit. The Program Unit also operates to prevent the jamming of the pellets PE in the Gauging Unit.

FIGS. 2A and 2B show only the details of the apparatus shown in FIG. 1 which concern themselves with the invention of this division. For description of the details of the related components of the complete system reference is made to the parent patent.

The Gauging Unit is connected to the Pellet Delivery Conveyor to receive the pellets PE for determining length, diameter and volume. The gauging is carried out with the pellet PE on an angle plate 105 supported from the support of the Pellet Delivery Conveyor. A pellet PE in gauge is urged against the vertical wall 107 of the plate 105 in measuring the length and against the base 109 in measuring the diameter. The surface of the base 109 is coextensive with a belt of the Pellet Delivery Conveyor by which the pellets are moved into this surface. The length of each pellet PE is gauged with the aid of LVDT1 which is mounted on plate (not shown) opposite the wall 107. The length feeler 111 extends over base 109 from LVDT1 in a direction perpendicular to the surface 107 and is urged towards this surface by a spring 113. The tip of this feeler 111 operates through a rectangular leaf spring (not shown) which is suspended from the support for LVDT1. The feeler 111 is connected to the core 119 of LVDT1. The armature of a solenoid is connected to feeler 111 to retract this feeler when the pellet PE is to be ejected from the Gauging Unit.

The diameter is gauged with the aid of LVDT2 which is mounted the plate (not shown) directly over the center portion of base 109. The diameter feeler 121 is connected to the core 123 of LVDT2 and is urged in a direction perpendicular to the surface of 109 by a spring 125.

Between gauging operations the feeler 121 is set so that its distance from surface 109 is just smaller than the diameter of the anticipated smallest diameter pellet PE. Also, at all times, except when the pellet is being ejected from the Gauging Unit, the retract solenoid is deenergized and the feeler 111 is set so that the tip of spring 115 is spaced from surface 107 a distance just shorter than the length of the shortest pellet PE. During operation a pellet PE is thrust between the spring 115 and surface 107 and feeler 121 and surface 109 by pusher (not shown) from the Pellet Delivery Conveyor. After the gauging operation the feeler 111 is retracted so that when the same pusher pushes the pellet PE out of gauge into the weighing pan 129 of the Weighing Unit the pellet PE is not deflected.

The pellets PE are ejected from the pan 129 along the Accept or Reject Channels by operation of the flipper (not shown) of the Ejector Unit (not shown in detail) in one direction or the other. The Accept Channel includes a guide 187 communicating with the pan 129 along which the accepted pellets PE move and the Reject Channel includes a like guide 189.

The Volume Deviation Unit includes potentiometer PL (FIG. 2) for setting an analogue of the length of the pellet PE, potentiometer PD for setting an analogue of the diameter, and potentiometers PLD and $PLD^2$ for computing an analogue of the volume. These potentiometers are connected to be supplied with direct-current voltage of the order of 25 volts between conductors or buses DL1 and DL2. In normal operation this supply draws about 400 miliamperes and is regulated to $\pm.05\%$. An intermediate electrical point of this supply is grounded. This point is determined by a voltage divider including resistors R1 and R3 between which potentiometer P6 is interposed.

The length potentiometer PL is connected in a bridge network BR1 including resistors R5 and R7 and the branches of PL. This network BR1 is connected between DL1 and DL2 through a resistor R21. The output conjugate terminals of the network BR1 are the adjustable arm of P1 and the junction of R5 and R7. These terminals are connected across a meter M1 through a fixed resistor R23 and a potentiometer P1.

The arm of PL is controlled by a cam CL1 rotatable by a servo motor SM1 (FIG. 2). The motor SM1 has fields SM1F1 and SM1F2. Field SM1F1 is controlled from the Program Unit and is supplied with alternating potential through conductors LG1 and LG2 during the gauging interval. Field SM1F2 is supplied with any unbalanced voltage which exists during a gauging operation. To compensate for this unbalance the Volume Deviation Unit includes LVDT3.

The primaries Z1 and Z3 of LVDT1 are supplied with an alternating potential from the same supply LG1–LG2 as SM1F1 through transformer T41, the secondary S71 of which typically supplies about six volts to Z1 and Z3. The primaries Z5 and Z7 are continuously supplied from the available supply usually through a transformer (not shown). LVDT1 is thus energized only during the gauging interval. The secondaries S1 and S3 are connected in series bucking relationship to the input of an amplifier A1. The output of this amplifier A1 is connected to supply field SM1F2. The core 301 of LVDT3 is connected to be controlled by cam CL1 together with the arm of PL.

LVDT1 is set by a factory or service adjustment so that the bridge BR1 in which PL is connected is balanced for a pellet PE of standard length. When a pellet of non-standard length is in gauge the potential of PL with respect to ground is negative if the length is less than standard and positive if it is higher than standard. The meter M1 measures the length deviation. An important feature of this invention is the selection of R21 so that PL over its whole range covers only that deviation of length which is acceptable. In a specific situation the setting of PL at its most negative point corresponds to 90% of standard length and the setting of PL at its most positive point corresponds to 110% of standard length.

The diameter potentiometer PD is connected in a network BR3 similar to BR1 and the output conjugate terminals of the network BR3 are likewise connected to a meter M2. The bridge BR3 is supplied from DL1 and DL2 through a resistor R27. The setting of PD at its most negative point corresponds to 97½% of standard diameter and the setting of PD at its most positive point corresponds to 102½% of standard diameter. Bridge BR3 is balanced for standard diameter. The meter M2 measures the diameter deviation.

Potentiometer PLD (FIG. 2) is connected through a resistor R29 between the arm of PL and DL2 and PLD$^2$ through a resistor R31 between the arm of PLD and DL2. The arms of PD, PLD and PLD$^2$ are operable together from a cam CL2 rotatable by motor SM2 which has fields SM2F1 and SM2F2 (FIG. 2).

The Volume Deviation Unit includes LVDT4. The primaries Z9 and Z11 of LVDT2 are connected to be supplied in parallel with primaries Z1 and Z3 and the primaries Z13 and Z15 of LVDT4 are connected to be supplied in parallel with Z5 and Z7 from the alternating supply. The secondaries S5 and S7 are connected in series bucking to the input of amplifier A3. The output of amplifier A3 supplies field SM2F2. The core 305 of LVDT4 is connected to cam CL2 to be positioned with the arms PD, PLD, PLD$^2$. With BR1 and BR2 balanced, PLD$^2$ produces the voltage analogue of standard volume.

The potential on the arm of PLD$^2$ is balanced with reference to ground through the arm of P6. The arm of P6 is connected to the arm of PLD$^2$ through meter M3, a potentiometer P3 and a resistor R33. P6 is set so that when PLD$^2$ is at standard volume the potential between PLD$^2$ and ground is zero. The meter M3 measures volume deviation.

The Weight-Deviation Unit includes LVDT5 which has primary Z19, secondaries S15 and S17 and a core 142. The core 142 is connected to the end of the balance arm 139 of the Weighing Unit which is opposite to the end to which the pan 129 is connected. Displacement of the pan 129 by a pellet causes movement of the core 142.

The primary Z19 is supplied with alternating current, typically from an oscillator (not shown) capable of delivering a frequency of about 2000 cycles per second. The secondaries S15 and S17 are connected bucking and a signal dependent on the setting of core 142 is derived from them on displacement of the core 142 from a position in which the output from the secondaries S15 and S17 is zero. Typically the core 142 is set to deliver zero output for a weight equal to the standard weight of a pellet PE. Departure from this weight of an actual pellet produces an alternating potential at the output of secondaries S15 and S17. The phase of this output is governed by the polarity of the departure and the magnitude by the magnitude of the departure.

The output from S15 and S17 is amplified and combined with the potential from the oscillator and passed through a demodulator (not shown) to produce a deviation-measuring signal, the polarity of which depends on the polarity of the pellet-weight departure from standard and the magnitude of which depends on the magnitude of this departure.

The actual determination of weight deviation is effected by rebalancing the scale after an unbalance. For this purpose a balancing coil 175 is provided. The coil 175 acts on a permanent magnet core 177 connected to the end of the arm 139 to which the pan 129 is connected and, in the event of an unbalance, moves the core 177 to return the pan 129 to the balance position. The potential impressed on winding 175 is the signal which measures the weight deviation. For precise setting of the core 177 a trimming coil 179 is provided.

The impact which the pellet PE produces as it drops into the pan 129 serves to produce an electrical impulse. This electrical impulse controls the activating of the Program Unit to produce the processing of the pellet PE following its weighing. To derive the impulse the potential pulse produced at weighing coil 175 when the pellet PE drops into the pan 129 is impressed through coupling capacitor C31 in the input of an amplifier A6. The output of A6 is impressed through capacitor C33 on the Program Unit to start the comparison and selecting operations.

The output of the demodulator (not shown) is adapted to be connected to the adjustable arm of a potentiometer P21 through the weighing coil 175, a resistor R51 and a front contact RC$a$ of a comparison relay (not shown) in the Program Unit. Contact RC$a$ is closed to start the determination of weight deviation. The potentiometer P21 is connected to ground through potentiometer P23 and is also connected across the weight deviation meter M4 through a resistor R53. P21 is shunted by a resistor R55. A filtering capacitor C21 is connected between the arm of P21 and ground.

The density deviation meter M5 is connected to measure the potential between the arm of P23 and the arm of PLD$^2$. This connection includes front contact RC$b$ of relay RC, the meter M5, a fixed resistor R57 and a variable resistor or potentiometer P25. This potential is the analogue of the difference between the weight deviation and the volume deviation and is the density deviation.

The meters M1, M2 and M5 have limit contacts 401 and 403, 405 and 407, and 409 and 411, respectively. A moveable contact 413, 415, 417, respectively, cooperates with each pair of limit contacts. Each contact 413, 415, 417 is actuable by the meter coils 419, 421, 423, respectively. Once a contact 413, 415, 417 engages an associated limit contact 401, 403 or 405, 417, or 409, 411 it is held in engagement by a holding coil 425, 427, 429, respectively. Contact 413 engages 401 when the length exceeds the upper length limit (typically is 110% of standard length) and engages 403 when the length is lower than the lower length limit (90% standard length). Contact 415 engages 405 when the diameter exceeds the upper limit (102.5% standard) and 407 when the diameter is below the lower limit (97.5% standard). Contact 417 engages 409 when the density exceeds the upper limit (102.5% standard) and 411 when the density is below the lower limit (97.5% standard).

The meters M1, M2 and M5 have holding coils 425, 427, 429 which are energized from conductors DP and DN and common conductor DO which supply direct current of opposite polarities derived from the Program Unit. Once one of the limit contacts of M1, M2 or M5 is closed it then remains closed as long as a relay (not shown) in the Program Unit, which operates to delay the sequencing until after the servo motors SM1 and SM2 stop, is actuated and this relay remains actuated until after the completion of the accept-reject operation.

Each contact 401, 403, 405, 407, 411 is connected to the associated lock in bus DP or DN through a relay RL11, RL13, RL15, RL17, RL19 and RL21, respectively. Each relay RL11 through RL19 has front contacts RL11$a$, RL13$a$, RL15$a$, RL17$a$, RL19$a$, RL21$a$ and RL11$c$ through RL21$c$ and a back contact RL11$b$ through RL21$b$, respectively. The front contacts RL11$a$ through RL21$a$ connect bus L to the reject bus RL when the associated relay is actuated. This energizes the reject relay RL7 in the Program Unit through back contact RL9$b$ of a relay (not shown) in the Program Unit which operates to carry out the actual operation. Thus once one of the relays RL11 through RL21 is actuated RL7 is actuated to produce a pellet reject operation. Each pair of back contacts RL11$b$ and RL13$b$, RL15$b$ and RL17$b$, RL19$b$ and RL21$b$ are connected in series with a signal lamp G1, G2, G3, respectively, and the secondary S51, S53, S55, respectively of a transformer T23, T25, T27, respectively, which is energized between L and ground.

The lamps G1, G2, G3 indicate that a pellet PE under processing has normal dimensions or density. When any of the relays RL11 through RL21 is actuated the associated lamp is deenergized to indicate an abnormality. Each of the contacts RL11c through RL21c when closed connects a counter CO1 through CO11 between L and ground. The number of pellets with excessively large or small lengths, diameters or densities is thus counted.

Preparatory to the use of the apparatus the disconnect switches or circuit breakers (not shown) for the apparatus are closed and power is applied. The master and slave LVDT's LVDT1 and LVDT3 and LVDT2 and LVDT5, respectively, are set so that the computer potentiometers PL and PD are centered to correspond to dimensions of a standard pellet PE and the meters M1, M2 and M3 read zero.

For this purpose a standard pellet PE is inserted in gauge and the relative positions of the primaries Z1 and Z3 and the secondary S1 and the primaries Z9 and Z11 and the secondary S5 are adjusted until the respective secondary outputs are zero. This output may be measured by an oscilloscope across the secondaries. The fields SM1F1 and SM2F1 are then each in its turn energized by a suitable switch (not shown) provided for this purpose. The fields SM1F2 and SM2F2 are then, each in its turn, connected only to S3 and S7, respectively, and the primaries and the secondaries of the slave LVDT's, LVDT3 and LVDT4 are adjusted until the secondary currents read zero with a zero marker on each of the cams CL1 and CL2 in the proper zero position. The frames of the potentiometers PL and PD, respectively, or the coupling between PL and CL1 and PD and CL2 are adjusted until the arms of PL and PD are centered and the meters M1 and M2 read zero. PLD and PLD$^2$ may be similarly adjusted with the aid of M3.

The scale 137 is then turned on its side so as to eliminate weight factors and the core 142 of LVDT5 is centered. The primary Z19 and secondaries S15 and S17 are then adjusted so that the secondary output across an oscilloscope is zero. The scale 137 is then set in weighing position and balanced mechanically with its balancing weights (not shown). A standard pellet PE is dropped into the pan 129. This closes contact RCa. The balancing weights (not shown) and the current through the trimming coil 179 are then adjusted until the meter M4 reads zero. The balancing weights serve for coarse adjustment and the trimming coil for fine adjustment. The potentiometer P23 may be adjusted at this point so that with the meter M3 reading zero the meter M5 also reads zero. A pellet PE having a predetermined weight deviation, say +10%, is then dropped into pan 129. The potentiometer P21 is now adjusted so that the meter M4 reads the weight deviation. Potentiometer P25 may be adjusted so that M5 reads the corresponding density deviation.

In operation a pellet PE is injected in gauge by the pusher not shown. Power is also applied to SM1F1, SM2F1, Z1 and Z3 and Z9 and Z11. The unbalance produced in LVDT1 and LVDT2 by the pellet PE causes amplifiers A1 and A3 to supply outputs to SM1F2 and SM2F2 which consist of a commercial frequency potential superimposed on direct-current potential. Motors SM1 and SM2 now rotate so that the slave LVDT's, LVDT3 and LVDT4 counteract the unbalance produced in LVDT1 and LVDT2, respectively, by the length and diameter deviations of the pellet PE in gauge. When the balance is achieved amplifiers A1 and A3 supply only D.C. to SM1F2 and SM2F2 dynamically braking motors SM1 and SM2 so that they stop instantaneously.

With the motors SM1 and SM2 stopped the potentiometers PL and PD are in the positions set by cams CL1 and CL2, respectively. Meters M1, M2 and M3 now have readings corresponding to these settings. If pointer 413 or 415 is in engagement with contacts 401 or 403 or 405 or 407 it remains so engaged.

The pellet PE now receives an impact causing it to drop in pan 129. The resulting impulse starts the weighing and selecting by closing RCa and RCb.

If the density is beyond the set limits pointer 417 closes contact 409 or 411.

While this comparing operation has been proceeding a timer in the Program Unit timed out and DP and DN are energized. If any of the meter contacts 413, 401, 403; 415, 405, 407; 417, 409, 411 are closed, one or more of the relays R11 through RL21 are energized, RL is energized and the character of the deviations is recorded. With RL energized RL7 is actuated. If the pellet PE is within the specification RL7 remains unactuated. Depending on whether RL7 is actuated or unactuated the pellet PE is injected in the accept or reject channel. The apparatus is then reset.

While preferred embodiments of this invention are disclosed herein many modifications thereof are feasible. This invention then is not to be restricted except insofar as is necessitated by the spirit of the prior art.

I claim as my invention:

1. Classifying apparatus for classifying an object in dependence upon the comparison of a physical dimension of said object with the corresponding dimension of a standard, the said apparatus comprising means to be connected to said object for deriving a measure of said dimension, variable impedance means connected to said deriving means to be set in accordance with said measure as an electrical analogue of said dimension, said impedance means being variable over its whole range only between limits extending from the electrical analogue of a relatively small percentage smaller than the corresponding dimension of said standard and the electrical analogue of a relatively small percentage greater than said corresponding dimension, memory switch means connected to said deriving means and actuable responsive to said deriving means when said dimension of said object falls outside of said limits, and means responsive to actuation of said switch means for classifying said object.

2. The method of selecting from a plurality of pellets only those pellets having a density within a predetermined standard range, said range corresponding to a predetermined standard volume and a predetermined standard weight, the said method comprising deriving an analogue of the deviation of the volume of each of said pellets from said standard volume, deriving an analogue of the deviation of the weight of each of said pellets from said standard weight, deriving an analogue of the difference between said weight analogue and said volume analogue, and responsive to said difference selecting only those pellets for which said difference is less than a predetermined difference corresponding to the limits of said range of density.

3. The method of selecting from a plurality of pellets only those pellets having certain dimensions falling within a predetermined range of standard dimensions and having densities within a predetermined range of a standard density with apparatus including an analogue of the volume corresponding to said standard dimensions and an analogue of a standard weight which at said standard volume corresponds to said standard density, the said method comprising deriving analogues of each of said certain dimensions for each pellet, responsive to each of said analogues respectively accepting only each pellet, all of the dimensions of which fall within said range of standard dimensions and rejecting all other pellets, deriving from said analogues of the dimensions of each said pellet and from said analogue of the volume corresponding to said standard dimensions the analogue of the deviation of said last-named pellet from said volume corresponding to said standard dimensions, weighing each of said pellets, deriving from said weighing and from said analogue of said standard weight an analogue of the deviation of the weight of said pellet from said standard weight for each pellet, deriving from said analogue of the devition of the weight and from said analogue of the deviation of the volume for each said pellet an analogue of the deviation of the density of each said pellet, and accepting only those of said pellets said deviation of the density of which falls within a range corresponding to said standard density and rejecting all other pellets.

References Cited by the Examiner

UNITED STATES PATENTS

| | | | |
|---|---|---|---|
| 2,587,686 | 3/1952 | Berry. | |
| 2,707,333 | 5/1955 | Schaurte | 333—147 |
| 2,851,880 | 9/1958 | Fiedler | 73—141 |
| 2,927,690 | 3/1960 | Malmquist | 209—81 |
| 2,930,943 | 3/1960 | Ruge | 317—149 |
| 2,944,736 | 7/1960 | Elms | 235—151.3 |
| 2,954,202 | 9/1960 | Bale | 209—121 X |
| 2,992,730 | 7/1961 | Rayburn | 209—81 |
| 3,032,191 | 5/1962 | Clukey | 209—75 |
| 3,039,604 | 6/1962 | Bickel | 209—75 |
| 3,048,329 | 8/1962 | Berggren | 235—150.22 |
| 3,104,315 | 9/1963 | Howard | 235—150.2 |
| 3,107,788 | 10/1963 | Thiele | 209—75 |

M. HENSON WOOD, JR., *Primary Examiner.*

ROBERT B. REEVES, *Examiner.*

J. N. ERLICH, *Assistant Examiner.*